US012043519B2

(12) United States Patent
Christen et al.

(10) Patent No.: US 12,043,519 B2
(45) Date of Patent: Jul. 23, 2024

(54) ELEVATOR SYSTEM

(71) Applicant: Inventio AG, Hergiswil (CH)

(72) Inventors: Lukas Christen, Kilchberg (CH); Roland Egli, Nottwil (CH); Stefan Weber, Niederwil AG (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/246,339

(22) PCT Filed: Sep. 22, 2021

(86) PCT No.: PCT/EP2021/076068
§ 371 (c)(1),
(2) Date: Mar. 23, 2023

(87) PCT Pub. No.: WO2022/069316
PCT Pub. Date: Apr. 7, 2022

(65) Prior Publication Data

US 2023/0356981 A1 Nov. 9, 2023

(30) Foreign Application Priority Data

Oct. 1, 2020 (EP) .................................... 20199522

(51) Int. Cl.
*B66B 19/00* (2006.01)

(52) U.S. Cl.
CPC .................................. *B66B 19/002* (2013.01)

(58) Field of Classification Search
CPC ...... B66B 19/002; B66B 19/04; B66B 19/005
See application file for complete search history.

(56) References Cited

U.S. PATENT DOCUMENTS 11,208,296 B2 * 12/2021 Christen ............... B66B 19/002
2011/0113720 A1 * 5/2011 Peacock .................. B66B 19/00
187/254

(Continued)

FOREIGN PATENT DOCUMENTS

DE 102018208588 A1 7/2019
WO 2018099761 A1 6/2018

(Continued)

OTHER PUBLICATIONS

Machine Translation of WO 2018/099761.*

*Primary Examiner* — Diem M Tran
(74) *Attorney, Agent, or Firm* — William J. Clemens; Shumaker, Loop & Kendrick, LLP

(57) ABSTRACT

An elevator system for a building, wherein an elevator shaft becomes taller as the building height increases during a construction phase, includes a self-moving construction-phase elevator car guided on a guide rail section(s) for conveying persons or goods during the construction phase, an assembly platform arranged above the car from which the guide rail section is elongated upwards in a rail assembly phase, an upper protection platform temporarily fixed in the elevator shaft on which the assembly platform is suspended via a cable-based lifting device or is suspended in the rail assembly phase, a lower protection platform, wherein the assembly platform is moved vertically between the upper platform and the lower platform by the lifting device during the rail assembly phase, and a docking device temporarily suspending the car on the lower platform to secure the car for evacuations, the docking device connecting the car to the lifting device.

13 Claims, 6 Drawing Sheets

(56) References Cited

U.S. PATENT DOCUMENTS

| | | | | |
|---|---|---|---|---|
| 2016/0152442 | A1* | 6/2016 | Weber | B66B 19/00 187/359 |
| 2021/0245998 | A1* | 8/2021 | Lanz | B66B 19/00 |
| 2023/0339727 | A1* | 10/2023 | Bizzozero | B66B 19/02 |

FOREIGN PATENT DOCUMENTS

| | | | | |
|---|---|---|---|---|
| WO | WO-2018099761 | A1 * | 6/2018 | B66B 11/0005 |
| WO | WO-2019068469 | A1 * | 4/2019 | B66B 19/00 |
| WO | 2019238530 | A1 | 12/2019 | |

* cited by examiner

ELEVATOR SYSTEM

FIELD

The invention relates to an elevator system comprising an elevator shaft which becomes taller as the building height increases over the course of the construction phase of the building. This elevator system can be used in particular on high-rise construction sites.

BACKGROUND

During the construction of the building, the lower floors created first can be finished to such an extent that they are already habitable or usable for other purposes. For this purpose, the elevator system comprises a construction-phase elevator car with which the floors already used as residential or business premises can be accessed during the construction phase of the building. The construction-phase elevator having this construction-phase elevator car grows with the building, so to speak, i.e., the usable lifting height of the construction elevator grows as the height of the building or elevator shaft increases. This makes it possible for construction workers and building materials or optionally users of apartments or business premises already occupied before the building is finished to be conveyed with the construction-phase elevator car during the construction period of the building.

In order to be able to realize the increasing usable lifting height of the construction-phase elevator in a simple manner, construction-phase elevator cars that are designed as self-moving elevator cars have been increasingly used in recent times. Such a self-moving elevator car, which is used in an elevator system for a building under construction comprising an elevator shaft that becomes taller as the building height increases over the course of the construction phase of the building, has become known, for example, from WO2019/238530 A1.

SUMMARY

It is an object of the present invention to overcome the disadvantages of what is known and in particular to create an elevator system of the type mentioned at the outset, which can be operated safely. Furthermore, the elevator system should be able to be adapted to the increasing height of the building in a simple and efficient manner.

These and other objects are achieved according to the invention by the elevator system having the features described below. The elevator system comprises a self-moving construction-phase elevator car which is guided on at least one guide rail section for conveying persons or goods for the duration of the construction phase of the building. Furthermore, the elevator system comprises an assembly platform which is arranged above the construction-phase elevator car and from which the at least one guide rail section can be elongated upwards in a rail assembly phase. Furthermore, the elevator system comprises, on the one hand, an upper protection platform, preferably designed as a support structure, which is temporarily fixed or can be temporarily fixed in the elevator shaft and on which the assembly platform can be suspended via a preferably cable-based lifting device or is suspended in the rail assembly phase, and, on the other hand, a lower protection platform, wherein the assembly platform can be moved between the upper protection platform and the lower protection platform in the vertical direction by means of the lifting device during the rail assembly phase.

Upper protection platform means that the protection platform is positioned at least temporarily above the assembly platform in or over the elevator shaft. Lower protection platform means that the protection platform is positioned at least temporarily below the assembly platform in the elevator shaft.

In a first embodiment, the elevator system can comprise a docking device associated with the lifting device for temporarily suspending the construction-phase elevator car on the lower protection platform for evacuations, the construction-phase elevator car being connectable to the lifting device via the docking device. As soon as the construction-phase elevator car is connected to the lifting device via the docking device, an evacuation run can be carried out by means of the lifting device. The term "evacuation phase" is understood below to mean the phase in which an evacuation run must be carried out in a construction-phase elevator car which has been unexpectedly shut down, for example after a fall arrester has been triggered.

Thanks to the self-moving construction-phase elevator car, it is advantageously achieved that construction workers and building materials can be conveyed with the construction-phase elevator car during almost the entire construction period of the building. Moreover, users of apartments or business premises already occupied before the building is finished can be conveyed between at least the floors associated with these spaces in compliance with the regulations, without having to interrupt operation for several days when adjustments are made to the lifting height of the construction-phase elevator car.

In comparison with so-called climbing lifts of conventional design, in which very heavy machine platforms have to be lifted in order to grow as the building height increases, comparatively lightweight platforms can be used in the present elevator system, which are easy to handle and which can be easily lifted in particular for efficient growth.

In the present document, the term "elevator shaft" should be understood to mean a space in a building under construction, the height of which increases in accordance with the construction progress, wherein the space is dimensioned and configured such that at least one elevator car of an elevator, usually an elevator car and a counterweight of one elevator each, can move upwards and downwards along vertical tracks in the space. Such an elevator shaft can be a single shaft enclosed by shaft walls. However, the elevator shaft can also be part of a continuous space, in which part the tracks of the elevator car and, if applicable, the counterweight of one of the at least two elevators arranged parallel to one another are arranged in each case, wherein there is no shaft wall between the tracks of adjacent elevators but usually steel beams for attaching elevator components.

In a preferred embodiment, the lifting device can comprise at least one connecting hook or another connecting element. If the lifting device is a cable-based lifting device, this connecting element serves to connect the cable to a load, for example. Alternatively, the cable can also be fixed by means of the connecting element to an anchorage for predefining a stationary fixed point. The counterpart to the connecting element can be a loop or eyelet assigned to the load. The connecting means could of course also be designed in the reverse manner; i.e., the loop or eyelet would then be associated with the cable and the connecting hook with the load.

The lifting device can be connected via the connecting element either to the assembly platform for the rail assembly phase, to the lower protection platform for a lifting process during a growth phase, or to a stationary fixed point, preferably arranged in the upper protection platform, for the evacuation phase. The connecting element is preferably attached to a free end of a cable of the lifting device. A connecting hook equipped with a safety catch is suitable as a connecting element, for example. An unintentional release of the connection with the respective counterpart on the assembly platform, the lower protection platform or the fixed point can be ruled out thanks to the safety catch. Instead of such safety load hooks, conventional single hooks are also conceivable. An advantage of this embodiment is that the elevator system can be set up quickly and easily for the operating phases necessary in each case. As already mentioned above, alternative solutions to the cable-based lifting device are also conceivable. Thus, instead of cables, the lifting device could also comprise straps or chains for lifting and lowering the assembly platform, for lifting the lower protection platform or for lifting and lowering the construction-phase elevator car.

The lifting device can preferably comprise a drive for operating the lifting device, wherein the drive is preferably fixed to the lower protection platform. With this drive, the cable of the cable-based lifting device or the belt or the chain of the lifting device can be moved.

Particularly preferably, the drive can be designed as a cable pull means and in particular as an endless winch. With a cable pull means, the cable of the lifting device can be moved reliably and at a sufficiently high speed. Furthermore, endless winches in particular are characterized by a low dead weight and low acquisition costs. A so-called "Tirak"™ hoist (Tractel of Foetz, Luxembourg) can be used as an endless winch, for example. Instead of endless winches, for example, cable pull devices with clamps are also conceivable (e.g., "Habegger" type, Habegger of Cincinnati, Ohio).

The elevator shaft can comprise shaft openings, wherein at least one shaft opening can be provided for each floor. Shaft doors can be installed into the shaft openings of the elevator shaft or already installed, via which the construction-phase elevator car and via which the final elevator car installed later is accessible from the floor.

The drive of the lifting device can be arranged on or at the edge of the lower protection platform. The edge arrangement of the drive of the lifting device can preferably be in the region of a front side of the lower protection platform. This front side is the side facing the shaft openings of the elevator shaft. In particular, if the drive is arranged in the region of the edge on the front side of the lower protection platform, advantages result in terms of handling. The drive can be easily reached from the floor via the respective shaft opening and can be operated as required by assembly personnel without walking on the lower protection platform.

The lower protection platform can comprise at least one deflection pulley for deflecting a cable of the lifting device coming from the drive or leading to the drive. The lower protection platform can comprise one or more deflection pulleys which are preferably arranged on an underside of the lower protection platform.

At least one deflection pulley for the cable of the lifting device can be arranged on the upper protection platform. The at least one deflection pulley can preferably be arranged on an underside of the upper protection platform. With this at least one deflection pulley—depending on which of the aforementioned operating phases (growth phase, rail assembly phase, evacuation phase) is to be carried out—the cable coming from the lower protection platform can be guided back to the lower protection platform for a lifting process during a growth phase, to the assembly platform for the rail assembly phase or to the stationary fixed point, preferably arranged on the upper protection platform, for the evacuation phase.

Two deflection pulleys for the cable of the lifting device are particularly preferably arranged on the upper protection platform. One of the two deflection pulleys can be arranged at the edge on the upper protection platform so that the cable coming from the lower protection platform can run along a shaft wall in the vertical direction to the upper protection platform. The other of the two deflection pulleys can preferably be arranged approximately centrally on the upper protection platform so that the cable can run from the upper protection platform in the vertical direction to the preferably centrally suspended assembly platform in the rail mounting phase. However, the central positioning does not have to be understood geometrically. "Central" means a position that is in a middle region or a region between the edge regions.

The cable course of the lifting device of the elevator system can be configured as follows: The cable can run from the drive downwards to a first deflection pulley associated with the lower protection platform, then horizontally to a second deflection pulley associated with the lower protection platform, then vertically upwards to a third deflection pulley of the upper protection platform, then horizontally to a fourth deflection pulley of the upper protection platform, and preferably finally to the connecting hook or another connecting element for connecting the cable to the assembly platform, the lower protection platform or the stationary fixed point, preferably arranged in the upper protection platform, wherein the connecting hook can form the cable end. The connecting hook can thus be attached to the cable end of the cable facing away from the drive.

Depending on the operating phase, the cable coming from the drive can be guided from the fourth deflection pulley vertically downwards to the assembly platform (during the rail mounting phase) or vertically downwards to the lower protection platform (during the growth phase). Instead of being guided vertically downwards, the cable can optionally also be guided further sideways to a fixed point on the upper protection platform by the fourth deflection pulley (e.g., during the evacuation phase).

For safe evacuation, it can be advantageous if the docking device comprises a free pulley block having a hook or another means to establish the connection with the construction-phase elevator car. The pulley block can be permanently suspended on the cable of the lifting device in the cable portion between the first and the second deflection pulleys below the lower protection platform or the pulley block is or can be at least temporarily suspended in this cable portion for the purpose of evacuation. The connecting means can be, for example, a hook equipped with a safety catch. In particular, a rapid evacuation of persons from the construction-phase elevator car can thus be ensured.

A safety net can be attached to the underside of the lower protection platform to prevent dangerous objects from falling into the shaft.

DESCRIPTION OF THE DRAWINGS

Additional advantages and individual features of the invention are derived from the following description of an exemplary embodiment and from the drawings. In the figures.

DETAILED DESCRIPTION

Figure 1:
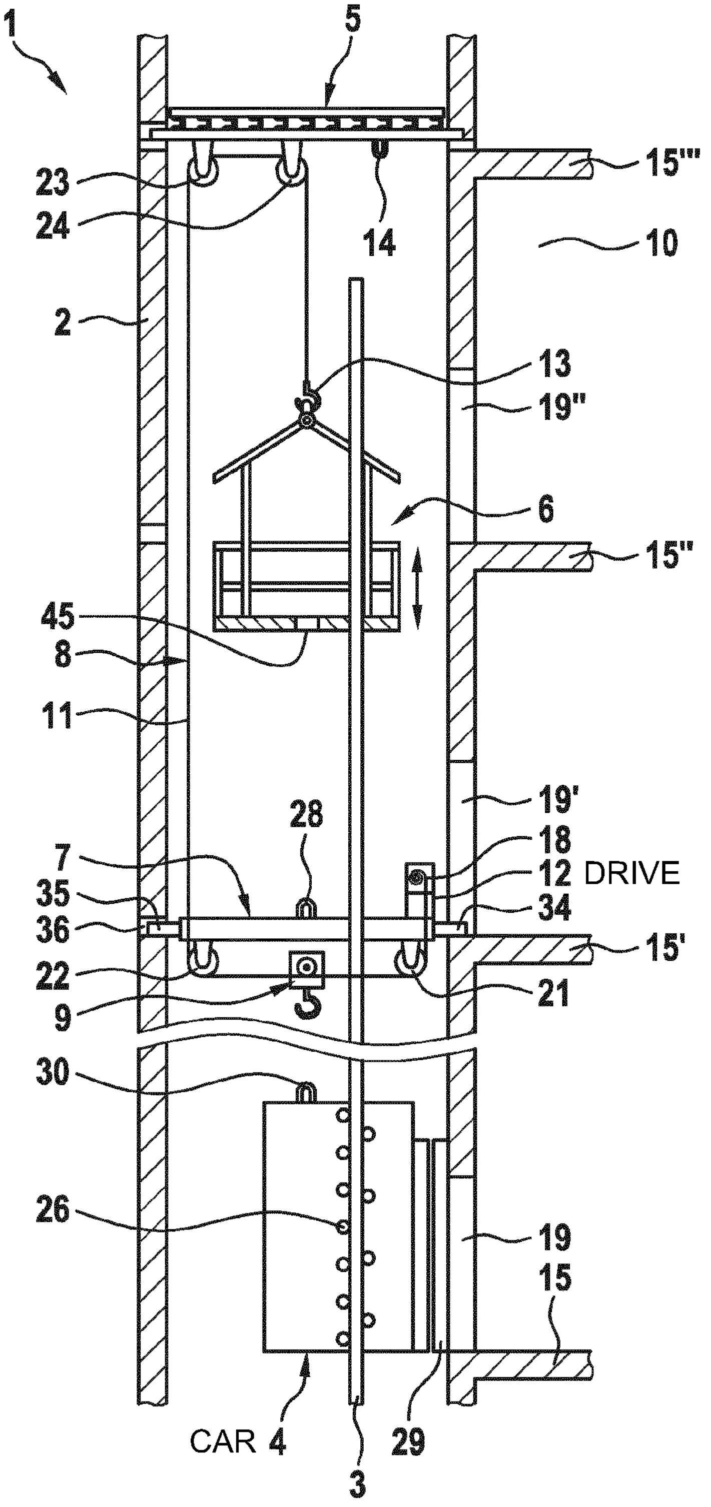
FIG. 1 is a schematic view of an elevator system according to the invention during a rail assembly phase.
Figure 2:
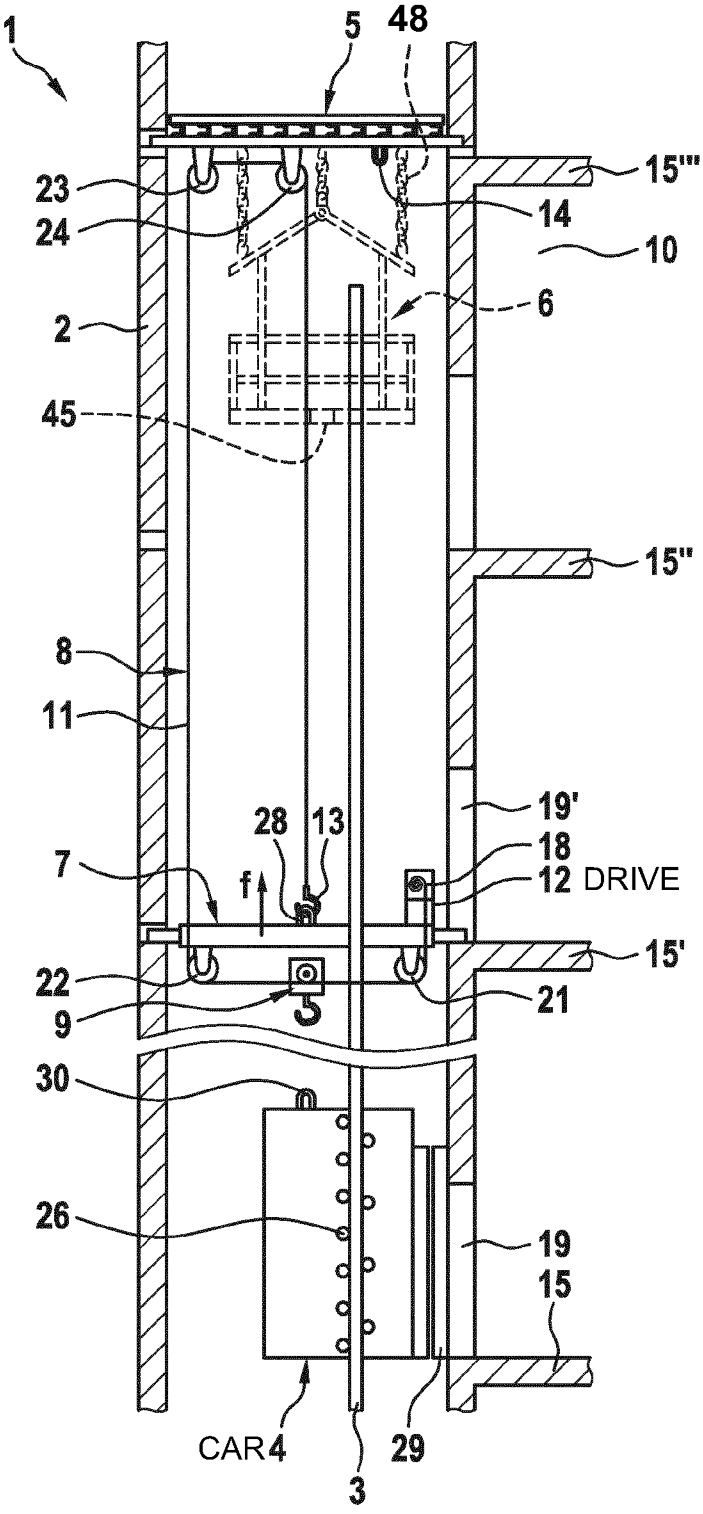
FIG. 2 shows the elevator system during the lifting process during a growth phase.
Figure 3:
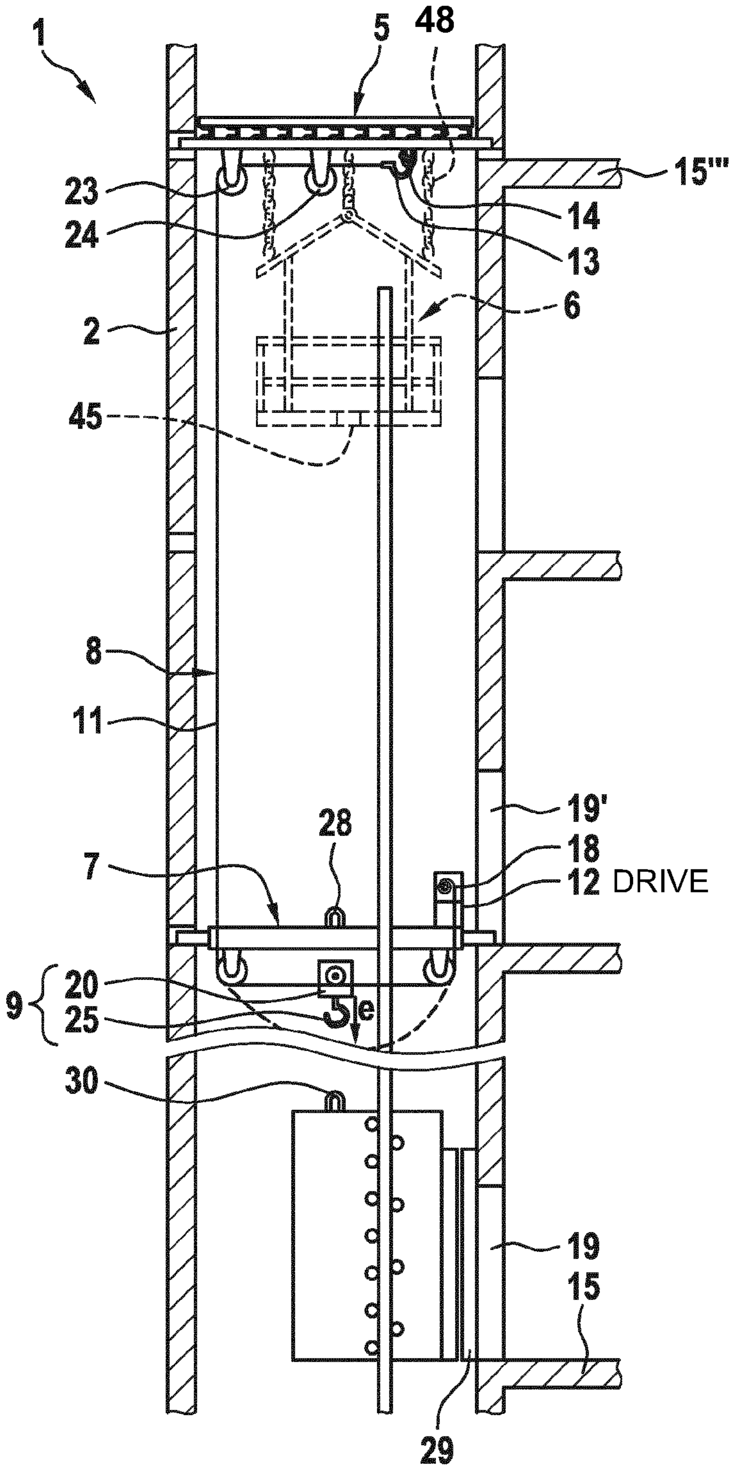
FIG. 3 shows the elevator system during an evacuation phase.

FIGS. 1 to 3 schematically show an elevator system 1 for a building 10 under construction. The building 10 comprises an elevator shaft 2 that becomes taller as the building height increases over the course of the construction phase. A construction-phase elevator car 4 is installed in the elevator shaft 2. During vertical movement, the self-moving construction-phase elevator car 4 is guided on at least one guide rail section 3. Above the construction-phase elevator car 4, the elevator system 1 has an arrangement for equipping the elevator shaft 2, which grows upwards, in particular with guide rails for the guide rail section 3. This arrangement comprises an upper protection platform 5, a lower protection platform 7 and an assembly platform 6 arranged between the two protection platforms 5, 7. The assembly platform 6 is the platform from which the guide rail section 3 is elongated upwards. The assembly platform 6 serves as a working platform for assembly personnel. Furthermore, the assembly platform 6 can also be used as transport means for other elevator components to be assembled in addition to the guide rails. The platforms 5, 6, 7 are connected to one another via a cable 11 to create an advantageous operative connection. The cable 11 is a component of a lifting device 8 that will be explained in more detail below.

For the sake of simplicity, only one guide rail section 3 is shown in FIGS. 1 to 3. Two guide rail sections lying opposite one another are preferably used to guide the elevator car. In the present exemplary embodiment, the guide rail section designated by 3 serves as a linear guide for the construction-phase elevator car 4 and later, after the construction-phase elevator car has been uninstalled, as a linear guide for the final elevator car (not shown) of the elevator for the finished building 10. The last-mentioned elevator generally also comprises a counterweight next to the (final) elevator car. Multiple guide rail sections is necessary for the optimal linear guidance of the elevator car and the counterweight, wherein each guide rail section consists of guide rail profile parts arranged in a row.

Other parts of the building outside of the elevator shaft 2 are not shown in the figures, apart from the floors which are designated by 15 and are shown in outline. The special feature of the elevator shaft 2 is the vertical extension which in the case of certain elevator shafts can practically extend over the entire height of the building. The building 10 can comprise one or more such elevator shafts 2. The elevator shaft 2 can be designed for one elevator having an elevator car and a counterweight. However, the elevator shaft 2 can also be designed for multiple elevators.

Viewed in the vertical direction, the elevator shaft 2 is divided into two portions, so to speak. The portion associated with the upper floors 15', 15", 15'" can be regarded as the first portion of the elevator shaft 2, in which portion the upper protection platform 5, the assembly platform 6 and the lower protection platform 7 are arranged. In a second portion of the elevator shaft 2, associated with the lower floors 15, the elevator shaft 2 is already installed with the necessary guide rails for the linear guidance of the elevator car and the counterweight of the elevator for the finished building. In this portion, the elevator system 1 for the building 10 under construction comprises the self-moving construction-phase elevator car 4 instead of the aforementioned conventional elevator car. The construction-phase elevator car 4 allows the transport of persons and goods to and from the lower floors even during the construction phase of the building. Shaft doors 29 can be installed in the shaft openings 19 of the elevator shaft 2 on the lower floors 15. These lower floors correspond to the floors 15 of the aforementioned second portion of the elevator shaft 2. In this case, the lower floors are those floors which are located below the uppermost floors 15', 15", 15'" that are still under construction.

The self-moving construction phase-elevator car 4 can be used to convey construction workers and building materials. However, users of apartments or business premises already occupied before the building is finished can also be conveyed between at least the floors associated with these spaces in compliance with the regulations. In order to enable the aforementioned elevator operation for construction workers and floor users, the construction-phase elevator car 4 is equipped with a car door system controlled by an elevator controller, which car door system interacts with shaft doors 29 which are each installed prior to adjusting the usable lifting height of the construction-phase elevator car 4 along the additional travel range in elevator shaft 2.

The self-moving construction-phase elevator car 4 for conveying persons or goods for the duration of the construction phase of the building 10 can comprise, for example, multiple driven friction wheels 26 which apply friction to the guide rail section 3 for climbing up. Reference is made to WO2019/238530 A1 for details on the structural design of such a friction wheel drive of a self-moving elevator car and on its mode of operation. Such self-moving construction-phase elevator cars can be moved up and down comparatively quickly, making them particularly suitable for very tall buildings with elevator shaft heights of over 100 m. Alternatively to the friction wheel drive, other drive solutions can also be used for the vertical movement of the construction-phase elevator car 4. Linear drives or rack and pinion drive systems, which have also already been referred to in the aforementioned document, are also possible.

The self-moving construction-phase elevator car 4 can comprise a safety brake (not shown) or another safety device, by means of which the construction-phase elevator car 4 is secured against falling. The safety brake is arranged on the construction-phase elevator car and acts on a guide rail of the construction-phase elevator car in order to bring the construction-phase elevator car to a standstill. The safety brake is controlled by a speed monitor, for example a so-called speed limiter. However, the safety brake can also be triggered by another control unit of the elevator system. The safety brake can be triggered due to an impermissible speed, an unintentional movement of the elevator cab car, exceeding a limit switch, an impermissible acceleration, an impermissible open state of the shaft door or an impermissible open state of the car doors. After the safety brake has been triggered, the construction-phase elevator car is stopped, wherein under certain circumstances the safety brake can be firmly fixed to the guide rail in such a way that the safety brake can be released from the guide rail by lifting the construction-phase elevator car and then the safety brake can be more easily transferred into its rest position. Finally, an evacuation run can be carried out. The evacuation run consists of the construction-phase elevator car 4 being moved at a reduced speed to an evacuation floor, which is generally the next floor up or down. The lifting of the construction-phase elevator car 4 for releasing the safety brake and the evacuation run can be carried out using the cable-based lifting device 8. The evacuation run and any previous release of the safety brake by lifting the construction-phase elevator car are part of the aforementioned evacuation phase.

The assembly platform 6 is arranged above the construction-phase elevator car 4, from which the at least one guide rail section 3 can be elongated upwards in a rail assembly phase. This rail assembly phase is shown in FIG. 1. In addition to the rail assembly, further work for the assembly of the shaft equipment or other work steps can be carried out from the assembly platform 6. In the phase which is referred to simply as the rail assembly phase, the assembly platform 6 can be moved upwards or downwards in the vertical direction to the desired position by means of the cable-based lifting device 8, wherein the travel path is limited by the upper protection platform 5 and the lower protection platform 7. The assembly platform 6 is suspended from the upper protection platform 5 via the cable-based lifting device 8. The assembly platform 6 is suspended via a connecting hook 13 arranged on the cable end of the cable 11. The upper protection platform 5 is fixed in the elevator shaft 2. The lower protection platform 7 is also fixed in the elevator shaft 2 in the rail assembly phase. For this purpose, the lower protection platform 7 comprises support means 34, 35 that can be retracted and extended. As can be seen from FIG. 1, the extended support means 35 engages in a recess 36 in the shaft wall and thus allows the lower protection platform 7 to be positioned in a stationary manner. On the opposite side in the region of the shaft opening 19', the extended support means 34 rests on the floor of the floor 15' and is preferably firmly attached to the floor, for example by means of screw connections.

The lower protection platform 7 comprises a drive 12 for moving the cable 11 and thus for vertical movement of the assembly platform 6. Starting from the drive 12 configured as a cable pull device, the cable 11 is guided upwards to the deflection pulleys 23, 24 of the upper protection platform 5 via deflection pulleys 21, 22 of the lower protection platform 7. From the upper protection platform 5, the cable 11 is guided back down to the assembly platform 6 via the deflection pulleys 23, 24 of the upper protection platform 5, to which the cable 11 of the lifting device 8 is connected. A cable store 18 in the form of, for example, a drum, onto which drum the cable 11 can be wound and unwound again, can be associated with the drive 12. The cable store 18 can be integrated into the drive 12 or can be a component of the lifting device 8 that is separate from the drive 12.

Figure 6:
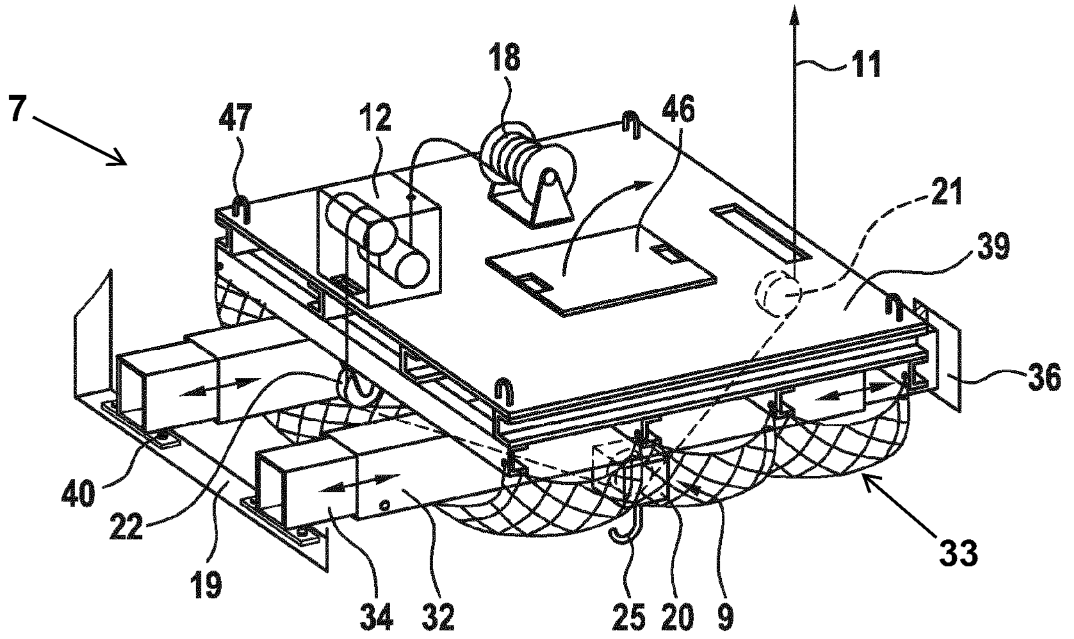
FIG. 6 shows a lower protection platform temporarily fixed in the elevator shaft from FIG. 5 with a lifting device for an elevator system according to the invention.

The protection platform designated by 5 is temporarily fixed in the uppermost region of the currently existing elevator shaft 2. The upper protection platform 5 is designed as a support structure. The support structure serves, inter alia, to support the lifting device 8, with which the assembly platform 6 can be moved upwards and downwards in the rail assembly phase. However, the upper protection platform 5 also has the task of protecting persons and equipment in the elevator shaft 2—in particular in the aforementioned assembly platform 6—from objects that could fall down during the construction work taking place on the building 10. The lower protection platform 7 serves, inter alia, to protect persons and equipment in the elevator shaft 2 and in particular also the construction-phase elevator car 4 from objects falling down from the assembly platform 6. Construction details for a possible configuration of the lower protection platform 7 are shown and explained below (FIG. 6).

A growth phase can follow the rail assembly phase. After completion of the rail assembly phase and after the elevator shaft 2 has become sufficiently taller as the construction of the building 10 progresses, the upper protection platform 5 must be positioned to a next higher level. For example, the upper protection platform 5 is raised to a next higher level with a construction crane, so that as the building height increases, the upper protection platform can grow with the elevator shaft 2 that has become taller. Under certain circumstances, however, it is also possible to bring the upper protection platform 5 to a next higher level by other means and without the use of a crane. After reaching the next higher level, the upper protection platform 5 is again temporarily fixed in the elevator shaft 2. Thereafter, the lower protection platform 7 can be raised to a next higher level. For this purpose, the cable 11 of the lifting device 8 is connected to the lower protection platform 7. For this connection, the lower protection platform 7 has a connection point 28, for example in the form of an eyelet, into which the hook 13 engages. The lower protection platform 7 can now pull itself up in one lifting process thanks to the drive 12 arranged on the lower protection platform 7 for moving the cable. This process is shown in FIG. 2. As soon as the lower protection platform 7 has reached the next higher level (e.g. shaft opening 19" at floor 15"), the lower protection platform 7 is again temporarily fixed in the elevator shaft 2. The growth phase is complete, and the next rail assembly phase can begin. The usable lifting height of the construction-phase elevator car 4 is thus gradually adjusted to the currently existing elevator shaft height.

The assembly platform 6 can be dismantled and removed from the elevator shaft 2 for the evacuation phase and/or for the growth phase and then reassembled in the elevator shaft. However, as indicated by dashed lines in FIGS. 2 and 3, the assembly platform 6 can also remain in the elevator shaft 2. For this purpose, the assembly platform 6 is moved upwards to the upper protection platform 5 with the lifting device 8 and then fixed to the upper protection platform 5. Corresponding means for suspending the assembly platform 6 are also shown by dashed lines and designated by 48. In the present case, the means for suspending the assembly platform comprise chains, for example. In this way, the assembly platform 6 is reliably parked for the evacuation phase and the growth phase. The assembly platform 6 comprises an opening 45 through which the hook 13 and the cable 11 can be guided.

It may happen that the construction-phase elevator car 4 becomes stuck and persons have to be evacuated from the construction-phase elevator car 4 because of this or for other reasons. For such situations, it could also be expedient in terms of safety to secure the construction-phase elevator car 4 against a fall in addition to the safety gear that is preferably already present. In order to carry out evacuation runs of the construction-phase elevator car 4, the elevator system 1 comprises a docking device 9 associated with the lifting device 8 for temporarily suspending the construction-phase elevator car 4 from the lower protection platform 7. The evacuation phase can take place as follows: The cable 11 is connected to a stationary fixed point 14. As shown in FIG. 3, this fixed point 14 can be arranged on the upper protection platform 5. The fixed point 14 can comprise, for example, an eyelet into which the hook is received. Thereafter, the cable 11 can be moved downwards to the construction-phase elevator car 4 by means of the drive 12. The docking device 9 is located at the apex of a downwardly suspended cable loop of the cable 11 and can thus be brought to the construction-phase elevator car 4. The construction-phase elevator car 4 is then connected to the lifting device 8 via the docking device 9. The construction-phase elevator car 4 is now also additionally secured by the lifting device 8. The construction-phase elevator car 4 can now be lifted by means of the cable-based lifting device 8 if required to release the safety brake. The cable-based lifting device 8 can be used to carry out the evacuation run to the evacuation floor. As soon as the construction-phase elevator car 4 has reached the evacuation floor, the evacuation phase is substantially complete.

As can be seen from FIGS. 1 to 3, the docking device 9 can be formed by a free pulley block 20 having a connecting hook 25. The pulley block 20 is suspended in a cable portion between the first deflection pulley 21 and the second deflection pulley 22 below the lower protection platform 7. As can be seen, the pulley block 20 is permanently suspended in the cable 11. It would also be conceivable for the pulley block 20 to be suspended in this cable portion of the cable 11 only when required. The pulley block 20 could therefore also be suspended in the cable 11 only temporarily for the purpose of evacuation according to FIG. 3 (see FIG. 4). The counterpart to the connecting hook 25 on the car side can be an eyelet 30 arranged on the construction-phase elevator car 4.

Figure 4:
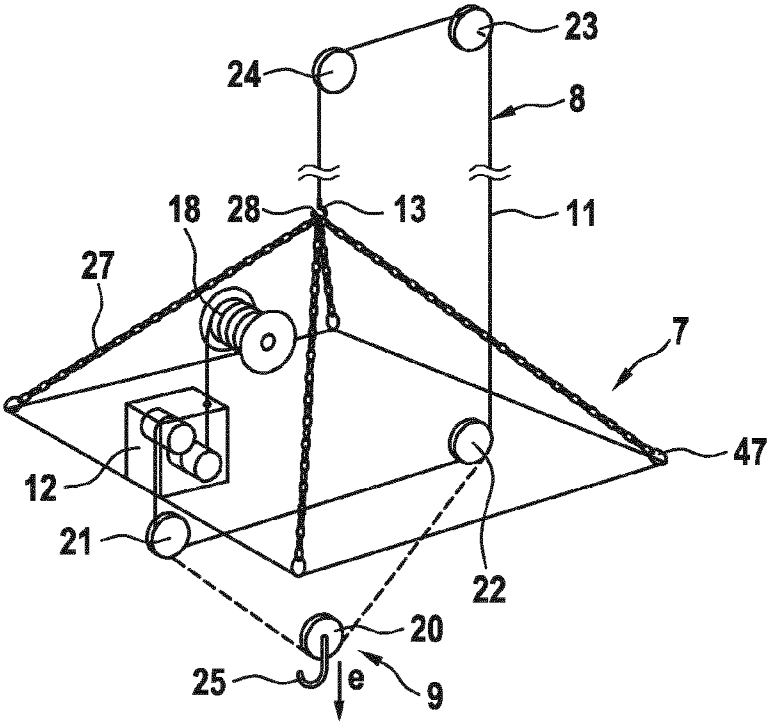
FIG. 4 is a simplified and perspective view of a lower protection platform and a lifting device for an elevator system according to the invention.

FIG. 4 shows the lower protection platform 7 and the cable course of the lifting device 8 during the growth phase. The lower protection platform 7 is provided with two deflection pulleys 21, 22 on its underside. Furthermore, two deflection pulleys 23, 24 are shown in FIG. 2. These deflection pulleys 23, 24 are those deflection pulleys which are associated with the upper protection platform 5 (not shown here) (see FIGS. 1-3). The drive 12 is arranged on the upper side of the lower protection platform 7 opposite the underside. As can be seen, the drive 12 is arranged on the lower protection platform 7 at the edge, preferably in the region of a front side facing the shaft openings 15 (not shown here; but see FIGS. 1-3).

The cable 11 of the lifting device 8 runs from the drive 12 downwards to the first deflection pulley 21 associated with the lower protection platform 7, then horizontally to the second deflection pulley 22 associated with the lower protection platform 7, then vertically upwards to the third deflection pulley 23 of the upper protection platform 5, then horizontally to the fourth deflection pulley 24 associated with the upper protection platform 5, and finally vertically downwards to the connecting element 13, which in turn is connected to the lower protection platform 7. An arrow e indicates that the pulley block 20 is moved downwards to the construction-phase elevator car (not shown here) with a view to evacuation.

According to the exemplary embodiment shown in FIG. 4, the lower protection platform 7 is connected to the connecting element 13 of the lifting device 8 via a suspension structure. This suspension structure comprises four individual chains 27 attached to corner points 47, which are merged to form a connection point 28. Instead of such a suspension structure, the connection point 28 can also be arranged directly on the lower protection platform 7, which is substantially configured as a plate. This variant was shown in FIGS. 1 to 3. For example, an eyelet 28 is attached to the upper side of the lower protection platform 7 to create the connection point.

The drive 12 designed as a cable pull device can in particular be an endless winch. The endless winch, which can comprise a motor with a gearbox or a gearless motor, is characterized by simple actuation. A so-called "Tirak" winch can be used as an endless winch, for example. Such endless winches also have the advantage that they are constructed very easily and robustly and are less prone to faults. Both the manufacturing costs and the maintenance costs can thus be minimized.

Figure 5:
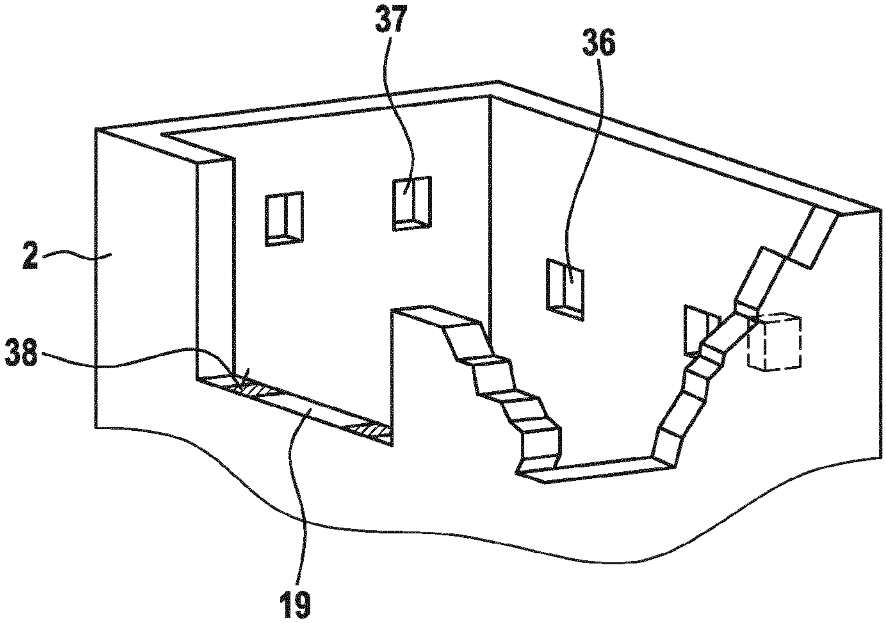
FIG. 5 is a perspective view of an elevator shaft under construction.

FIG. 5 shows a possible configuration of an elevator shaft 2. Formwork for concreting can be used to create the elevator shaft 2. With the aid of such formwork, recesses 36, 37 for the stationary positioning of the protection platforms can be easily created. Bearing surfaces designated by 38 for positioning the protection platforms in the region of the shaft opening are also shown in FIG. 5.

FIG. 6 relates to an exemplary embodiment of how a lower protection platform 7 can be temporarily fixed in this elevator shaft 2. The lower protection platform 7 comprises two longitudinal members 32, which in the present exemplary embodiment are configured as box profiles. The lower protection platform 7 is positioned in the elevator shaft in a stationary manner on the front side via extended support means 34. The retraction and extension movement of the support means 34 received in the respective box profile is indicated by a double arrow. To fix this position in the region of the front side, the supporting means 34 can be fixedly connected to the floor using screws 40. Wedges, for example, can be used in the region of the recesses 36 on the rear shaft wall in order to securely anchor the extended support means 34 in the recess 36.

Figure 7:
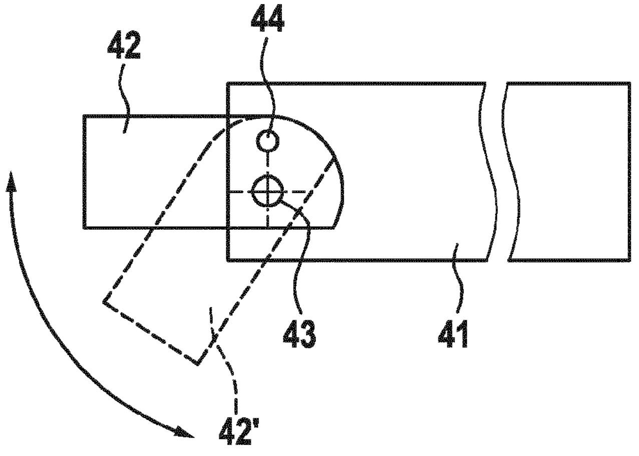
FIG. 7 is a side view of an end of a cross member of a lower protection platform, wherein the cross member serves to temporarily fix the lower protection platform in the elevator shaft according to an alternative exemplary embodiment to the version shown in FIG. 7.
Figure 8:
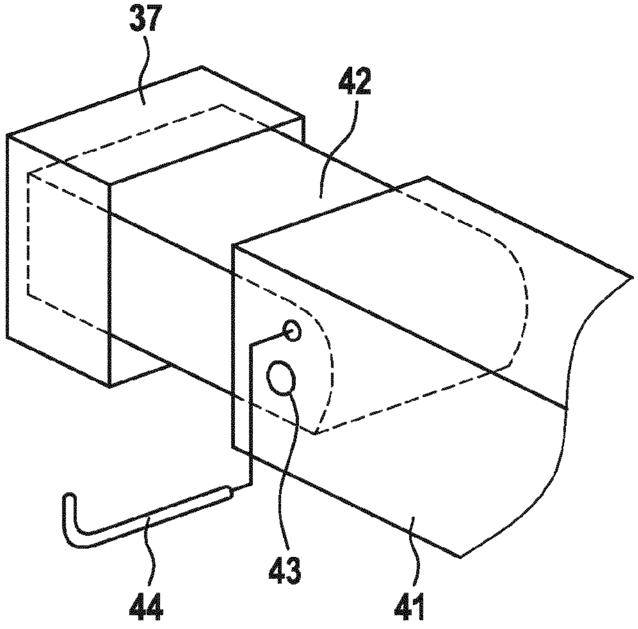
FIG. 8 is a perspective view of the cross member according to FIG. 7.

As an alternative to the connection shown in FIG. 6, the lower protection platform 7 could also be positioned in a stationary manner in the elevator shaft via cross members (not shown). Instead of the longitudinal members 32, the lower protection platform 7 can comprise cross members extending transversely to the longitudinal members 32 with movable support means, wherein these support means can be inserted into the recesses 37 shown in FIG. 5 to further secure the stationary position. The latter support means can be pivotably attached to the cross members. Such an arrangement is shown in FIGS. 7 and 8. A cross member of the lower protection platform 7 is designated by 41. The pivotable support means is designated by 42. The support means 42 which is attached to the cross member 41 so as to be pivotable about the pivot axis 43 can be pivoted into the horizontal position shown in FIG. 7 or FIG. 8 and fixed in this position by means of a locking pin 44. An intermediate position of the partially pivoted support means is indicated by 42'. The support means can be prestressed, for example by means of springs, so that the support means 42 are pivoted out into the horizontal position under spring action.

FIG. 6 shows further structural details of the lower protection platform 7. The aforementioned "Tirak" winch is used here as an endless winch 12. It can also be seen that the upper side of the lower protection platform 7 can be formed by a plate 39. Flank walls, which are inclined relative to a horizontal line and are arranged such that they protrude outwards, can adjoin the horizontal plate 39. Such flank walls can ensure that as far as possible no gap or at most a very narrow gap remains between the lower protection platform and the walls of the elevator shaft, through which falling objects could reach. Instead of a single plate, four horizontal individual plates could also be used, for example. These individual plates can be moved and thus adapted to different shaft cross-sections.

A hatch 46 is provided in the plate 39. For example, the pulley block 20 having the connecting hook 25 can be reached via the open hatch 46. In this way, the connecting hook 25 can be easily connected to the eyelet 30 on the construction-phase elevator car 4 from above.

A safety net 33 is then attached to the underside of the lower protection platform 7, which is intended to prevent dangerous objects from falling into the shaft.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system for a building under construction, wherein during a construction phase of the building an elevator shaft becomes taller as a height of the building increases, the elevator system comprising:

a self-moving construction-phase elevator car guided on at least one guide rail section in the elevator shaft for conveying persons or goods for a duration of the construction phase of the building;

an assembly platform arranged in the elevator shaft above the construction-phase elevator car and from which the at least one guide rail section can be elongated upwards in a rail assembly phase of the construction phase;

an upper protection platform temporarily fixed in the elevator shaft above the assembly platform and on which the assembly platform is suspended via a cable-based lifting device during the rail assembly phase;

a lower protection platform arranged in the elevator shaft between the construction-phase elevator car and the assembly platform, the assembly platform being movable between the upper protection platform and the lower protection platform in a vertical direction by the lifting device during the rail assembly phase; and a docking device adapted to temporarily suspend the construction-phase elevator car on the lower protection platform to secure the construction-phase elevator car for an evacuation phase, the construction-phase elevator car being selectively connectable directly to the lifting device via the docking device.

2. The elevator system according to claim 1 wherein the lifting device includes a connecting element adapted to connect the lifting device to the assembly platform during the rail assembly phase, to the lower protection platform for a lifting process during a growth phase of the construction phase, or to a stationary fixed point for an evacuation process during an evacuation phase of the construction phase.

3. The elevator system according to claim 2 wherein the connecting element is a hook.

4. The elevator system according to claim 1 wherein the lifting device includes a drive attached to the lower protection platform.

5. The elevator system according to claim 4 wherein the drive is a cable pull means.

6. The elevator system according to claim 5 wherein cable pull means is an endless winch.

7. The elevator system according to claim 4 wherein the drive is arranged at an edge on the lower protection platform.

8. The elevator system according to claim 4 wherein the lower protection platform includes at least one deflection pulley deflecting a cable of the lifting device coming from the drive or leading to the drive.

9. The elevator system according to claim 8 wherein the at least one deflection pulley is arranged on the upper protection platform.

10. The elevator system according to claim 4 wherein the lifting device includes a cable that runs from the drive downwards to a first deflection pulley, then horizontally to a second deflection pulley, then vertically upwards to a third deflection pulley of the upper protection platform, then horizontally to a fourth deflection pulley, and finally to a connecting element adapted to connect the lifting device to the assembly platform during the rail assembly phase, to the lower protection platform for a lifting process during a growth phase of the construction phase, or to a stationary fixed point for the evacuation phase during the construction phase.

11. The elevator system according to claim 10 including a docking device adapted to temporarily suspend the construction-phase elevator car on the lower protection platform to secure the construction-phase elevator car for an evacuation process, the construction-phase elevator car being selectively connectable to the lifting device via the docking device, wherein the docking device includes a free pulley block having a connecting hook to establish a connection with the construction-phase elevator car, wherein the pulley block is adapted to be suspended on the cable of the lifting device in a cable portion between the first deflection pulley and the second deflection pulley below the lower protection platform during the evacuation phase.

12. An elevator system for a building under construction, wherein during a construction phase of the building an elevator shaft becomes taller as a height of the building increases, the elevator system comprising:

a self-moving construction-phase elevator car guided on at least one guide rail section in the elevator shaft for conveying persons or goods for a duration of the construction phase of the building;

an assembly platform arranged in the elevator shaft above the construction-phase elevator car and from which the at least one guide rail section can be elongated upwards in a rail assembly phase of the construction phase;

an upper protection platform temporarily fixed in the elevator shaft above the assembly platform and on which the assembly platform is suspended via a cable-based lifting device during the rail assembly phase;

a lower protection platform arranged in the elevator shaft between the construction-phase elevator car and the assembly platform, the assembly platform being movable between the upper protection platform and the lower protection platform in a vertical direction by the lifting device during the rail assembly phase;

wherein the lifting device includes a drive attached to the lower protection platform; and wherein the lifting device includes a cable that runs from the drive downwards to a first deflection pulley, then horizontally to a second deflection pulley, then vertically upwards to a third deflection pulley of the upper protection platform, then horizontally to a fourth deflection pulley, and finally to a connecting element adapted to connect the lifting device to the assembly platform during the rail assembly phase, to the lower protection platform for a lifting process during a growth phase of the construction phase, or to a stationary fixed point for the evacuation phase during the construction phase.

13. The elevator system according to claim 12 including a docking device adapted to temporarily suspend the construction-phase elevator car on the lower protection platform to secure the construction-phase elevator car for an evacuation process, the construction-phase elevator car being selectively connectable to the lifting device via the docking device, wherein the docking device includes a free pulley block having a connecting hook to establish a connection with the construction-phase elevator car, wherein the pulley block is adapted to be suspended on the cable of the lifting device in a cable portion between the first deflection pulley and the second deflection pulley below the lower protection platform during the evacuation phase.

* * * * *